United States Patent [19]
Ferrazzi et al.

[11] Patent Number: 5,436,785
[45] Date of Patent: Jul. 25, 1995

[54] ELECTRONIC TRIP DEVICE COMPRISING AN EARTH PROTECTION

[75] Inventors: Marc Ferrazzi, Fontaine; Alain Del Vecchio, Echirolles, both of France

[73] Assignee: Merlin Gerin, France

[21] Appl. No.: 127,035

[22] Filed: Sep. 24, 1993

[30] Foreign Application Priority Data
Oct. 5, 1992 [FR] France ............... 9211986

[51] Int. Cl.⁶ .................................. H02H 3/26
[52] U.S. Cl. ........................ 361/42; 361/45; 361/93
[58] Field of Search ............ 361/42, 45, 47, 48, 361/93, 96, 85, 86

[56] References Cited
U.S. PATENT DOCUMENTS
3,697,810 10/1972 Wilson et al. ............... 361/42
4,899,246 2/1990 Tripodi ........................ 361/44

FOREIGN PATENT DOCUMENTS
0179017 4/1986 European Pat. Off. ...... H02H 3/093
2212667 7/1974 France ........................ H02H 3/26

*Primary Examiner*—Marc S. Hoff
*Assistant Examiner*—S. Jackson
*Attorney, Agent, or Firm*—Parkhurst, Wendel & Rossi

[57] ABSTRACT

An electronic trip device comprising, for each phase or neutral line, a rectifier bridge formed by four diodes which rectify the transformer current, a resistance for measuring the rectified current, and a circuit for detecting the sign or polarity of the measured current connected to one end of the transformer. A processing circuit calculates a value representative of the earth fault current by adding all the current values whose corresponding sign is positive and subtracting all the current values whose corresponding sign is negative. This current value is processed so as to bring about tripping when a threshold is exceeded for a preset time.

8 Claims, 7 Drawing Sheets

ELECTRONIC TRIP DEVICE COMPRISING AN EARTH PROTECTION

BACKGROUND OF THE INVENTION

The invention relates to an electronic trip device for a multipole electrical circuit breaker protecting an electrical power system comprising:

a current sensor per pole supplying a secondary current proportional to a current flowing in an associated conductor of the power system protected by the circuit breaker, a detection and rectifying circuit to which the secondary currents are applied and which supplies signals representative of the currents flowing in the conductors to be protected, an electronic processing unit receiving the signals supplied by the detection and rectifying circuit and delivering a tripping order, with or without a time delay, when the currents flowing in the conductors to be protected or an earth fault current exceed preset thresholds.

Figure 1:
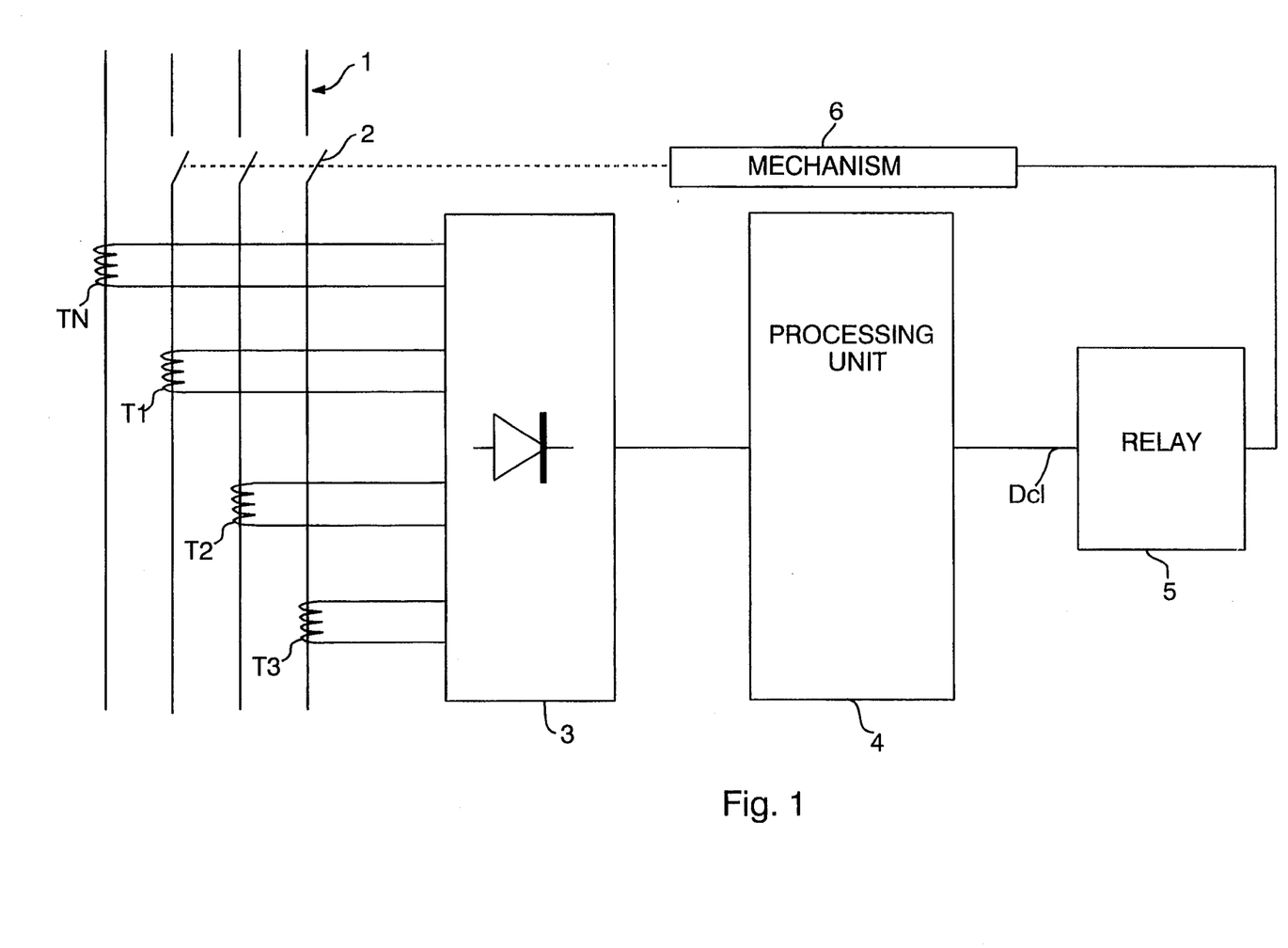
FIG. 1 is a partially schematic diagram of a state-of-the-art circuit breaker.

Electronic circuit breakers comprising an earth fault protection function use earth fault current signal measurement or reconstitution circuits. FIG. 1 represents a circuit breaker of state-of-the-art type. An electrical power system 1 to be protected is composed of electrical conductors, generally corresponding to the three phases and neutral of an installation. Contacts 2 enable the current in the phase conductors to be established or interrupted. In the figure as in a great many installations, the neutral conductor is distributed without being broken. Current transformers T1, T2, T3 and TN associated with the different power system conductors transform the primary currents of high value into secondary currents compatible with electronic trip devices. The secondary currents are applied to the input of a phase, neutral and earth fault current rectifying and detection circuit 3. This circuit supplies signals representative of these currents to an electronic processing unit 4. A tripping order Dc1 produced by the processing unit 4 is applied to the input of a control relay 5 which actuates an opening mechanism 6 of the circuit breaker contacts 2.

Figure 2:
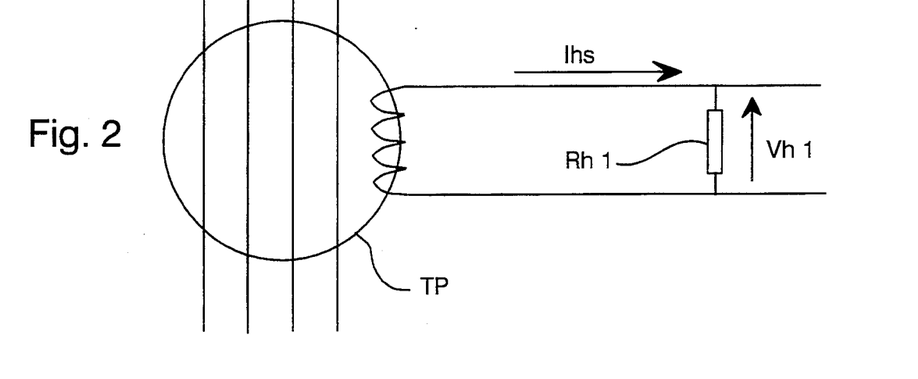
FIG. 2 is a schematic diagram of a transformer used in some state-of-the-art trip devices.
Figure 3:
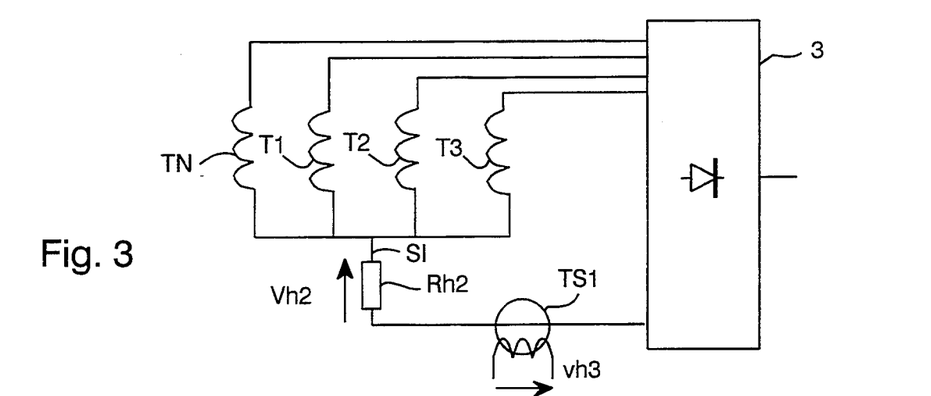
FIG. 3 diagramatically represents reconstituting a signal representative of an earth fault from secondary currents of several transformers.

In some state-of-the-art trip devices measuring of the earth fault current is achieved by means of a transformer Tp represented in FIG. 2. The transformer primary is formed by all the conductors of the power system 1 and a secondary winding supplies a current Ihs proportional to the earth fault current of the power system. A signal representative of this secondary current Ihs can be supplied by the voltage Vh1 at the terminals of a resistance Rh1 connected in parallel on the secondary winding of the transformer. FIG. 3 represents a diagram reconstituting a signal representative of an earth fault from the secondary currents of the current transformers TN, T1, T2 and T3. The sum of the secondary currents is obtained in a common conductor SI to which a first end of each of the current transformer secondary windings is connected, the second ends of these windings being connected directly to the rectifying circuit 3. The common conductor SI is connected via measuring means to the rectifying circuit. A current representative of the earth fault current, corresponding to the sum of the secondary currents of all the transformers, flows in the conductor SI. The measuring means can be formed by a resistance Rh2, the voltage Vh2 at the terminals of this resistance being representative of the earth fault current. Alternative measuring means are also represented in FIG. 3 in the form of a transformer TS1 whose primary winding is formed by the conductor SI. The measurement voltage Vh3 at the terminals of the secondary winding of the transformer TS1 is also representative of the earth fault current.

Figure 4:
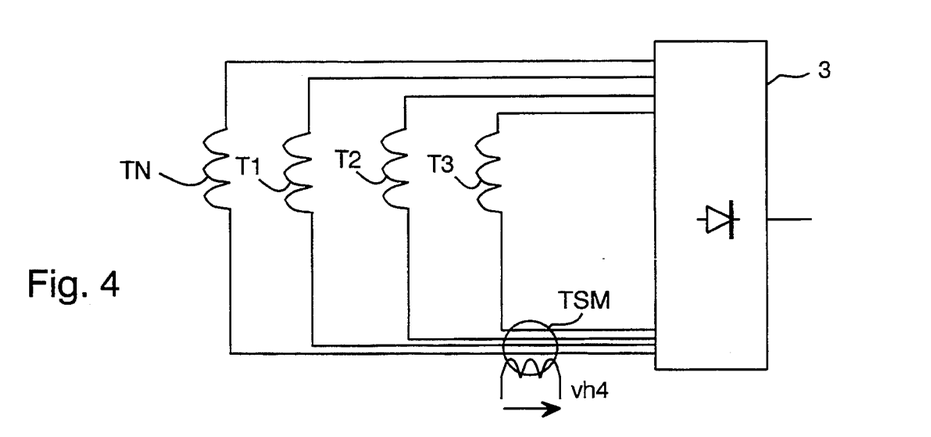
FIG. 4 diagramatically illustrates a system similar to that of FIG. 3, but wherein the ends of the secondary winding of each transformer are converted to the rectifying circuit, to provide independence of the currents.

In trip devices using the rms value of the currents, total independence of the currents is necessary. A device according to the diagram of FIG. 4 enables this independence to be achieved. In this embodiment the two ends of the secondary winding of each current transformer (T1, T2, T3, TN) are connected to the rectifying circuit. The set of these secondary windings forms the primary of a transformer TSM which supplies at the terminals of its secondary winding a measurement voltage Vh4 representative of the earth fault current in the power system.

The signals Vh1, Vh2, Vh3, or Vh4 are then applied to the processing unit 4. In other trip devices, digital processing circuits calculate a value representative of the earth fault according to the amplitudes of the values of the phase and neutral currents as in U.S. Pat. No. 4,631,635.

State-of-the-art earth fault protection devices use, for reconstitution of the earth fault signal, electronic components occupying a large volume on the printed circuit boards. These components are often transformers, power diodes or resistors followed by shaping amplifiers. The cost and volume of these additional components are very high for electronic trip devices fitted on circuit breakers with low ratings.

Digital processing trip devices reduce the number of these power components but sample-and-hold circuits are required for simultaneous measurement of the current values. Moreover state-of-the-art algorithms for calculating the earth fault current value are not suitable for all phase and neutral current configurations, notably when these currents are not of pure sinusoidal shape.

SUMMARY OF THE INVENTION

The object of the invention is to achieve an electronic trip device comprising components occupying a reduced space and processing circuits able to reconstitute the earth fault current value in all phase and neutral current configurations.

According to the invention the detection and rectifying circuit of the electronic trip device comprises means for supplying the processing unit separately with signals representative of the rectified secondary currents and signals representative of the signs of the polarities of said secondary currents, the electronic processing unit comprising means for determining the value of an earth fault current representative of the vector sum of the currents flowing in the conductors to be protected.

According to an embodiment of the invention, the detection and rectifying circuit comprises a group of diodes associated with each current sensor, connected as a rectifier bridge, a first and second diode connected by their cathodes to a positive power supply point, a third and fourth diode connected by their anodes to a measuring resistance, the first and third diodes being connected in series and their common point being connected to a first output of the associated current sensor, the second and fourth diodes being connected in series and their common point being connected to a second output of the associated current sensor, one of the two outputs of the current sensor being connected to the means for detecting the sign of the current flowing in said sensor, said detection means supplying on output a first value if the current sign is positive or a second value if the current sign is negative, the common point between the third diode, the fourth diode and the measuring resistance supplying a signal representative of the absolute value of the current.

According to a development mode of the invention, the means for detecting the current signs comprise, for each sensor, a transistor comprising a reference electrode connected to the ground of a power supply, a control electrode connected to the associated current sensor and an output electrode connected to an electronic processing circuit.

In a preferred embodiment the electronic processing unit determines an instantaneous value of the earth fault current by adding the values of the currents from the sensors whose corresponding sign is positive and subtracting the values of the currents from the sensors whose corresponding sign is negative.

According to a particular embodiment the electronic processing unit comprises analog-to-digital conversion means so as to sample the values of the currents from the sensors, calculating means for determining the value of a sample of the earth fault current, and means for producing a tripping signal when the value of the earth fault current exceeds a threshold for a preset time.

BRIEF DESCRIPTION OF THE DRAWINGS

Other advantages and features will become more clearly apparent from the following description of illustrative embodiments of the invention, given as non-restrictive examples only and represented in the accompanying drawings in which.

DETAILED DESCRIPTION OF THE PREFERRED EMBODIMENT

Figure 5:
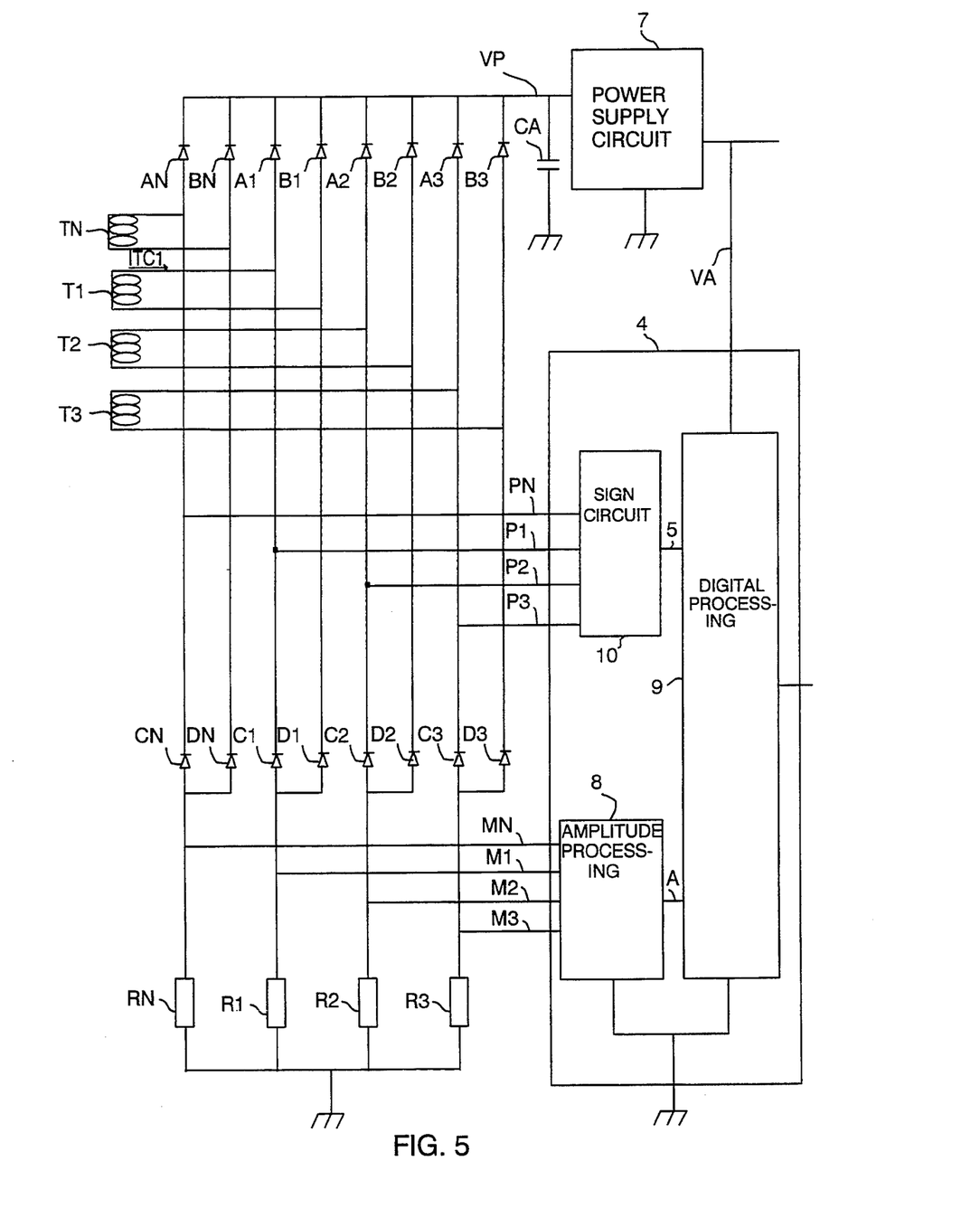
FIG. 5 represents the diagram of a trip device according to the invention.

The invention comprises in the processing unit 4 means for determining the value of the earth fault current without using bulky components. The diagram of a trip device according to an embodiment of the invention is represented in FIG. 5. Each secondary winding of the current transformers is connected to a rectifier bridge represented by a group of four diodes. For each current transformer T1, T2, T3, TN a first end P1, P2, P3, PN of the secondary winding is connected to the anode of a first associated diode A1, A2, A3 or AN and to the cathode of a second associated diode C1, C2, C3 or CN whereas a second end of the secondary winding of T1, T2, T3 or TN is connected to the anode of a third diode B1, B2, B3 or BN and to the cathode of a fourth associated diode D1, D2, D3 or DN. The cathodes of the first and second diodes A1, A2, A3, AN, B1, B2, B3 and BN are connected to a positive power supply line Vp. The anodes of the second and fourth diodes associated with a secondary winding (C1, D1, C2, D2, C3, D3, CN, DN) are connected to a first terminal of an associated measuring resistance (R1, R2, R3, RN), the other terminal of each of the measuring resistances being connected to an electrical reference ground of the trip device. The positive power supply line Vp charges a capacitor CA and supplies an input voltage to a power supply circuit 7 which circuit supplies a regulated voltage VA for supply of the trip device. The first terminals of the resistances R1, R2, R3 RN are connected by conductors M1, M2, M3, MN to the inputs of an amplitude processing circuit 8. The output of the circuit 8 supplies to a digital processing circuit 9 rectified signals A representative of the absolute values of the currents of the power system to be protected.

The first end of each current transformer T1, T2, T3, TN is connected by a conductor P1, P2, P3, PN to the input of a current sign detection circuit 10. This circuit 10 supplies on an output S, for each input, a first value if the current sign is positive and a second value if the current sign is negative. The output S of the circuit is connected to the digital processing circuit 9.

When a current ITC1 of positive polarity flows in the secondary winding of the transformer T1, it flows via the diode A1 to charge the capacitor CA and supply the trip device via the circuit 7. The current returns via ground and the measuring resistance R1, then via the diode D1 and the second end of the transformer secondary. The presence of positive current brings the voltage of the conductor P1 up to a value greater than 0 V. The sign detection circuit detects this voltage and supplies on its output a first value representative of the positive polarity of ITC1. The voltage measured at the terminals of the resistance R1, between the conductor M1 and ground, has a negative value. If the current ITC1 is of negative polarity, the second end of the transformer secondary has a positive voltage. The current flows via the diode B1 to charge CA and supply the trip device, the return being via the measuring resistance R1 and diode C1. The measuring voltage R1 between M1 and ground is always negative whereas the voltage at P1 becomes negative and the sign detection circuit supplies on output a second value, representative of the negative polarity of ITC1. The currents flowing in the other secondaries of the current transformers (TN, T2, T3) and directed by the associated rectifying diodes produce the same effects on the sign detection circuit 10 and the inputs of the amplitude processing circuit 8.

Figure 6:
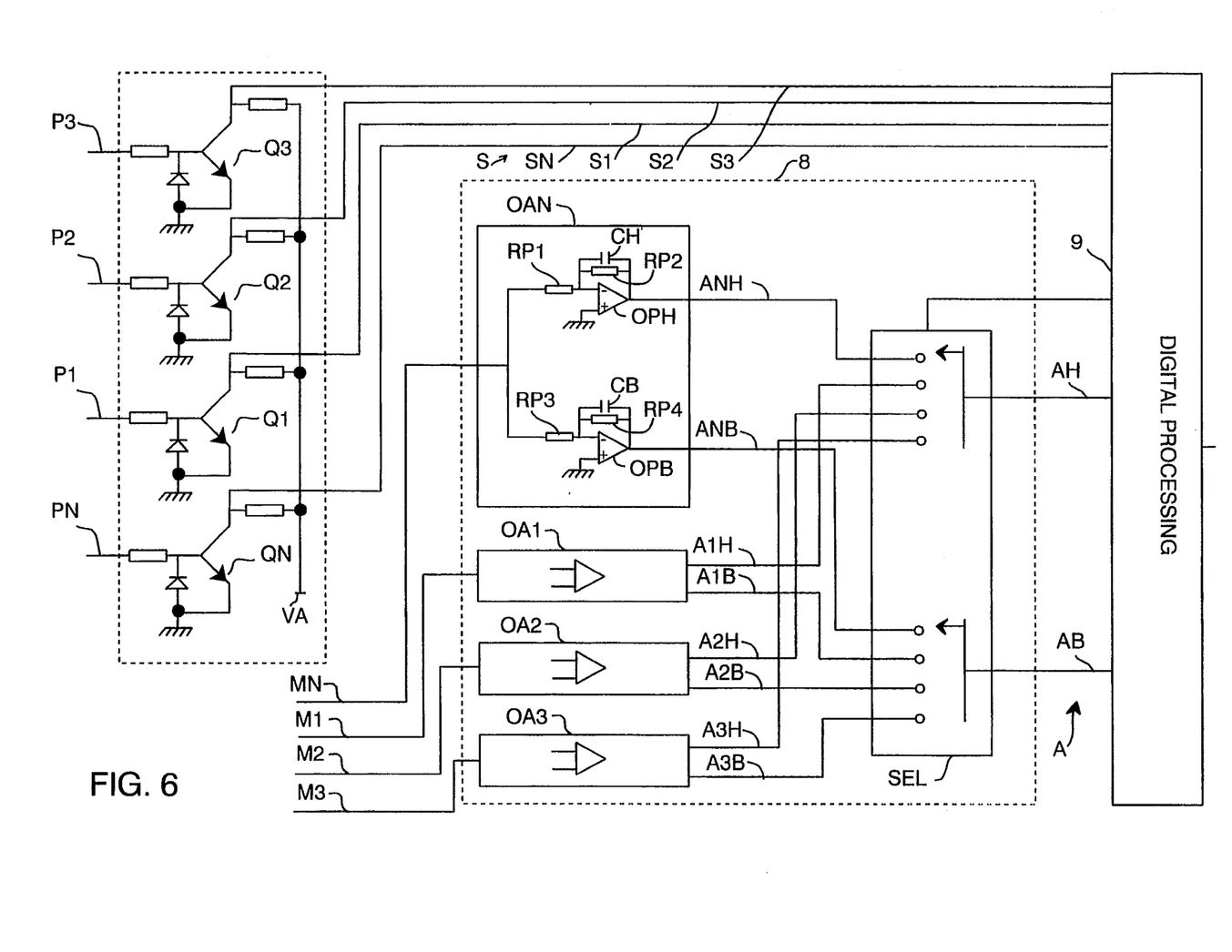
FIG. 6 shows the diagram of an embodiment of the processing unit of the trip device according to FIG. 5.

The diagram of an embodiment of the processing unit 4 is represented in FIG. 6. The sign detection circuit comprises four transistors Q1, Q2, Q3, QN each comprising an emitter connected to the reference ground, a collector connected to the supply voltage VA by means of an associated polarizing resistance and a base connected respectively to one of the conductors P1, P2, P3, PN, by means of limiting resistances. Diodes protecting against reverse voltages are connected between the emitter and base of each transistor. The sign detector output S comprises four lines, respectively S1, S2, S3, SN, connected to the collectors of the transistors respectively Q1, Q2, Q3, QN and to the digital processing circuit 9. Applying a positive voltage on an input of the detection circuit 10 causes turn-on and saturation of the corresponding transistor to supply on the corresponding output a first voltage value close to 0 V. When the voltage applied on an input is not positive, the corresponding transistor is turned off and the corresponding output supplies a second voltage value close to the value of the supply voltage VA.

The amplitude processing circuit 8 represented in FIG. 6 comprises four amplification groups OAN, OA1, OA2, OA3 and a selector SEL. Each group comprises two operational amplifiers connected as inverting amplifiers which amplify and make positive the input signals supplied by the conductors MN, M1, M2, M3 representative of the voltage at the terminals of the measuring resistances RN, R1, R2, R3. The two amplifiers have different gains to achieve a large dynamic measuring range. For example, for the group OAN a first amplifier OPH amplifies the high amplitude signals with a low gain whereas a second amplifier OPB amplifies the weak signals with a high gain. Polarizing and feedback resistances, RP1 connected between the conductor MN and the inverting input of OPH, RP2 connected between the inverting input and the output ANH of OPH, RP3 connected between the conductors NM and the inverting input of OPB, and RP4 connected between the inverting input and the output ANB of OPB, set the gain values. Capacitors CH and CB connected between the inverting inputs and the outputs of the amplifiers respectively OPH and OPB limit the pass-band and reduce strays. The outputs of the amplifiers ANH and ANB are connected to a selection circuit SEL. The amplification groups OA1, OA2, OA3 are formed in the same way as the group OAN, outputs A1H, A2H, A3H correspond to the output ANH, and outputs A1B, A2B, A3B correspond to the output ANB. Analog signals representative of the amplitudes of all the power system currents and digital signals representative of the corresponding signs are thus obtained, in parallel, on output from the circuit 10 and amplification groups OA1, OA2, OA3 and OAN. The selection circuit SEL comprises two electronic selectors. The first one selects sequentially, under the control of the circuit 9, a signal AH from among the four signals ANH, A1H, A2H or A3H corresponding to the high amplitudes and the second one selects sequentially, under the control of the circuit 9, a signal AB from among the four signals ANB, A1B, A2B or A3B corresponding to the low amplitudes. The selected signals AH and AB are applied to the digital processing circuit 9.

Figure 7:
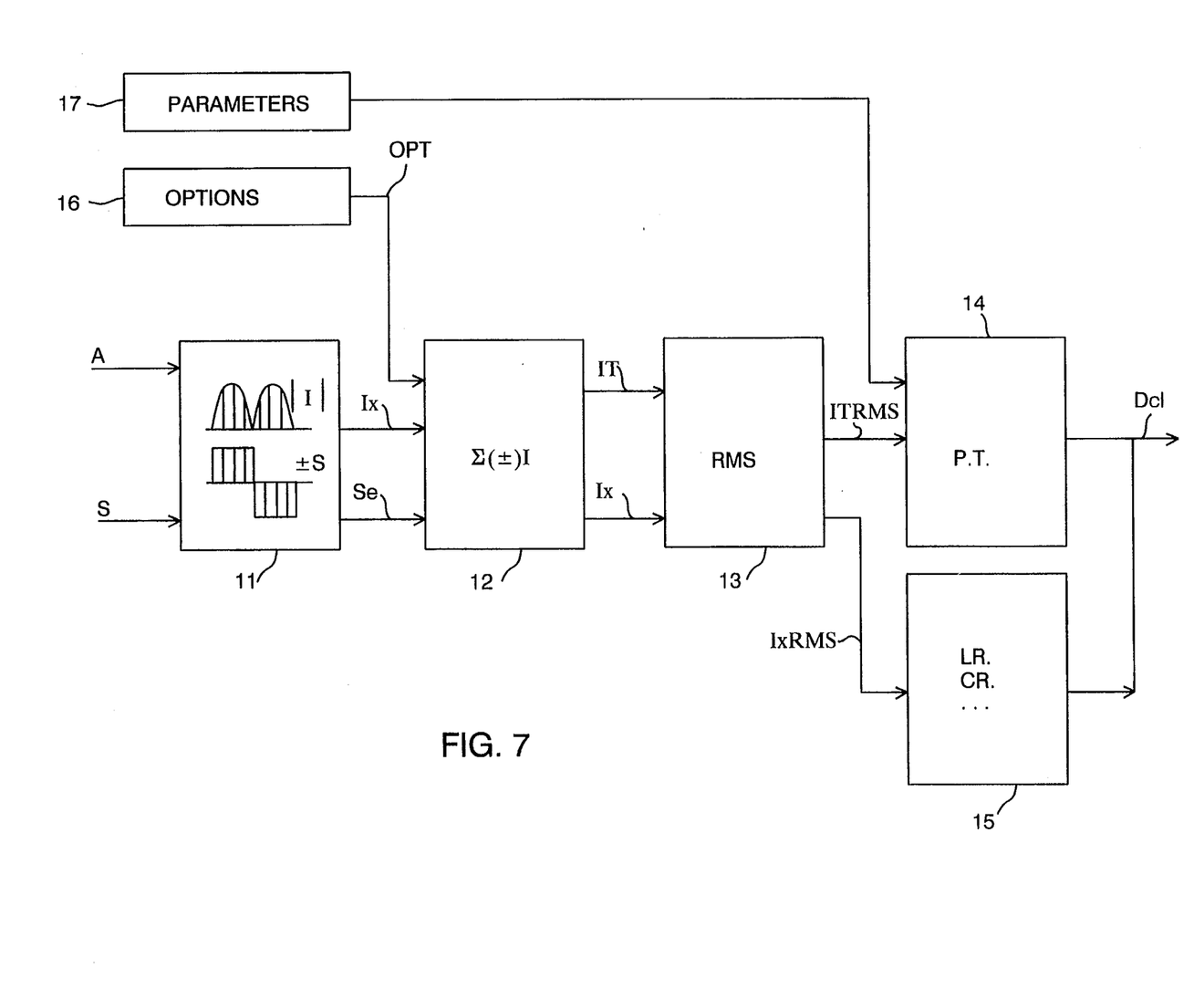
FIG. 7 represents a particular embodiment of the processing circuit of the unit according to FIG. 6.

FIG. 7 shows a particular architecture of the digital processing circuit 9. Means 11 perform reading, sampling and digital conversion of the absolute values of the currents and signs. These digital values of the currents I1, I2, I3, IN represented by Ix and of the signs S1, S2, S3, SN represented by Se are applied to means 12 for calculating the instantaneous values. An option configuration input 16 informs the means 12 via the line OPT whether a residual type earth fault protection is to be performed or whether earth fault protection is not activated on the trip device. If a residual type earth fault protection is selected, the means 12 calculate a value representative of the vector sum of the currents. According to an embodiment of the invention this value is obtained by adding the current samples whose corresponding sign is positive and subtracting the current samples whose corresponding sign is negative. Outputs of the means 12 respectively supply the four values Ix of the measured current samples in absolute value, and the calculated value IT of an earth fault current obtained by vector summing. These instantaneous values are then processed by means 13 for calculating the rms values of the phase and neutral currents IxRMS, and of the earth fault current ITRMS. The rms earth fault current is supplied to the input of means 14 for processing earth protection. Adjustment means 17 supply the processing means 14 with parameters such as the threshold and time delay values. When an earth fault exceeds a threshold for a preset time, the means 14 give a tripping order Dc1 on output. The rms values of the phase and neutral currents IxRMS are applied to means 15 for processing the other tripping functions, notably the functions referred to as long delay and short delay.

Figure 8:
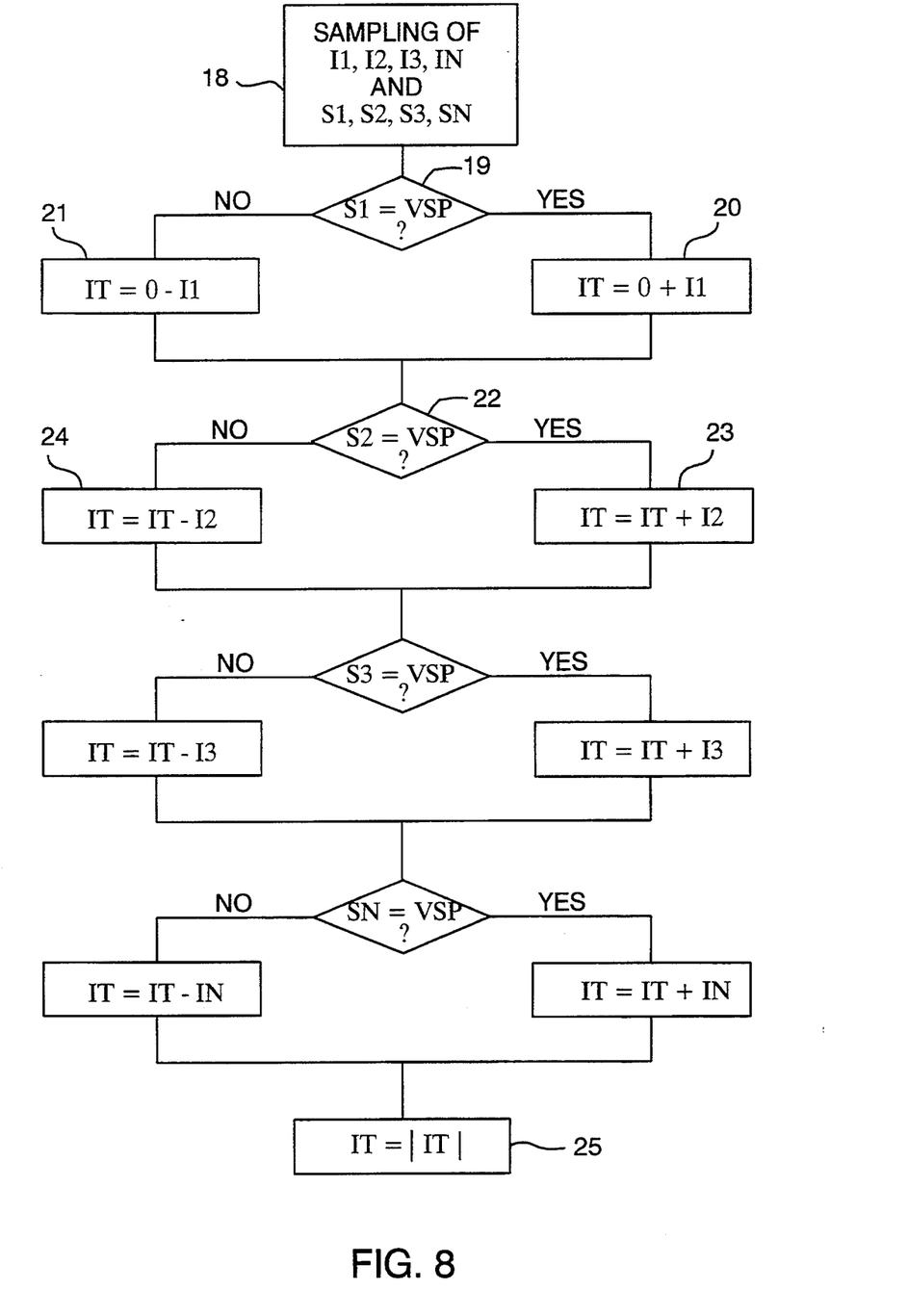
FIG. 8 shows an algorithm for determining the value of the earth fault current.

The means represented in FIG. 7 can be achieved either in the form of hard-wired circuits or in the form of functions programmed in a microprocessor. FIG. 8 illustrates an algorithm for calculating the value of the earth fault current able to be used in this case. During a stage 18 the digital processing circuit samples the values representative of the rectified currents I1, I2, I3, IN and the values representative of the signs S1, S2, S3, SN. For each current value, the corresponding amplitude and sign are sampled simultaneously. During each sampling stage the time separating sampling of two currents corresponding to two different phase conductors I1, I2 must be sufficiently small so as not to introduce any error. For example a sampling time of 16 μs enables an error of less than 1% to be achieved.

If the value of S1 takes a value VSP representing a positive voltage of the conductor P1, the comparison 19 directs the processing to a calculation stage 20 where a quantity IT representative of an earth fault current takes the value of I1 (0+I1), the initial value IT being nil. In the opposite case, in a stage 21, IT takes a value −I1 (0−I1). Then a comparison 22 directs the processing, if the sign of the current I2 is positive, to a stage 23 which adds the value of I2 to the previous value of IT (IT=IT+I2). If the sign of I2 is negative a stage 24 subtracts the value of I2 from the previous value of IT (IT=IT−I2). Processing is identical for phase 3 and neutral. If S3 is representative of a positive sign of I3, IT=IT+I3, otherwise IT=IT−I3, and if the sign SN of IN is positive IT=IT+IN otherwise IT=IT−IN. At the end of the algorithm a stage 25 transforms the signed value of IT into an unsigned absolute value representative of a rectified earth fault current. A zero value of IT indicates that the power system to be protected does not comprise an earth fault. The value of IT is then transmitted to the means 13 for calculating the rms value.

Figure 9:
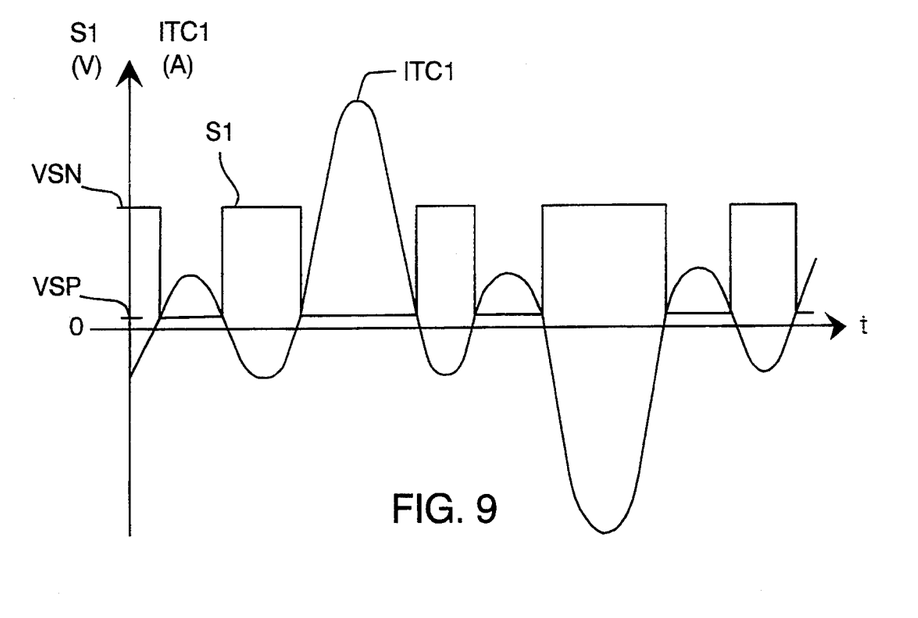
FIGS. 9 and 10 illustrate deformed currents and the signals of the corresponding signs.
Figure 10:
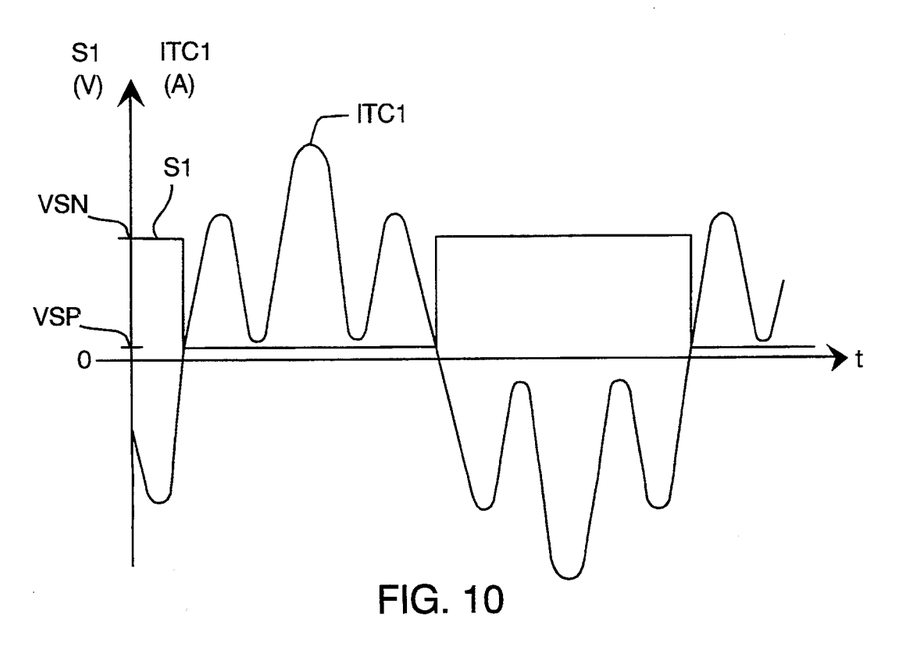

Detection of the signs of the currents flowing in the current transformer secondaries is well-suited to deformed currents. FIG. 9 represents detection of the sign of a deformed current ITC1 presenting a large third harmonic ratio. When the sign of the current ITC1 is negative the sign detection signal S1 has a first value VSN, and when the current ITC1 goes above zero the value of the signal S1 switches to a second value VSP. The current ITC in FIG. 10 has a lower third harmonic ratio than that of FIG. 9. The passages via zero are less frequent and the sign detection period corresponds to the sign change period of the fundamental period of the power system. In both cases use of the sign and amplitude to form the vector sum enables a satisfactory earth fault current value to be obtained.

In the preferred embodiment described above the sign detection circuit 10 comprises bipolar transistors, but this detection can be performed by any other means, notably comparators, operational amplifiers, field effect transistors or logic circuits. Detection can also be integrated into the processing circuit 9. The amplitude processing circuit comprises 4 amplification groups each of which is made up of two operational amplifiers in order to have a good precision over a wide measuring range. However in most trip devices a single amplifier per group is sufficient. According to another embodiment of the invention which is not represented, the trip device does not comprise an amplifier, an analog-to-digital converter directly converts the negative voltages present on the conductors MN, M1, M2, M3, supplied by the measuring resistances. The selection circuit SEL can be integrated into a conversion circuit, with several analog inputs. The measuring resistances are placed between the cathodes of the rectifying diodes CN, DN, C1, D1, C2, D2, C3, D3 and ground, but they could in the same way be placed between the anodes of the diodes AN, BN, A1, B1, A2, B2, A3, B3 and the positive power supply point VP. The inputs connected to the conductors PN, P1, P2, P3 for detection of the signs can be connected to any one of the ends of the current transformer windings, respectively TN, T1, T2, T3. The processings described in the preferred embodiments are digital, although other embodiments of the invention may involve analog processings for calculating the value representative of an earth fault current.

We claim:

1. An electronic trip device for a multipole electrical circuit breaker protecting an electrical power system comprising:
   a current sensor per pole supplying a secondary current proportional to a current flowing in an associated conductor of the power system protected by the circuit breaker,
   a detection and rectifying circuit to which the secondary currents are applied and which supplies signals representative of the currents flowing in the conductors to be protected,
   an electronic processing unit receiving the signals supplied by the detection and rectifying circuit and delivering a tripping order, with or without a time delay, when the currents flowing in the conductors to be protected or an earth fault current exceed present thresholds,
   wherein the detection and rectifying circuit comprises means for supplying the processing unit separately with signals representative of the rectified secondary currents and signals representative of the signs of the polarities of said secondary currents, and
   wherein the electronic processing unit comprises means for determining the value of an earth fault current based on said signals representative of the rectified secondary currents and said signals representative of the signs of the polarities of said secondary currents.

2. The electronic trip device according to claim 1, wherein the electronic processing unit comprises means for detecting the signs of the current connected to the detection and rectifying circuit in such a way as to receive the signals representative of the current polarity signs, means for processing the current signal amplitudes, and a digital processing circuit connected to the outputs of the means for detecting the signs and of the means for processing the amplitudes.

3. The electronic trip device according to claim 1, wherein the electronic processing unit determines an instantaneous value of the earth fault current by adding the values of the currents from the sensors whose corresponding sign is positive and subtracting the values of the currents from the sensors whose corresponding sign is negative.

4. The trip device according to claim 1, wherein the electronic processing unit comprises analog-to-digital conversion means so as to sample the values of the currents from the sensors, calculating means for determining the value of a sample of the earth fault current, and means for producing a tripping signal when the value of the earth fault current exceeds a threshold for a preset time.

5. An electronic trip device for a multipole electrical circuit breaker protecting an electrical power system comprising:
   a current sensor per pole supplying a secondary current proportional to a current flowing in an associated conductor of the power system protected by the circuit breaker;
   a detection and rectifying circuit to which the secondary currents are applied and which supplies signals representative of the currents flowing in the conductors to be protected;
   an electronic processing unit receiving the signals supplied by the detection and rectifying circuit and delivering a tripping order, with or without a time delay, when the currents flowing in the conductors to be protected or an earth fault current exceed present thresholds;
   wherein the detection and rectifying circuit comprises means for supplying the processing unit separately with signals representative of the rectified secondary currents and signals representative of the signs of the polarities of said secondary currents;
   wherein the electronic processing unit comprises means for determining the value of an earth fault current representative of the vector sum of the currents flowing in the conductors to be protected;
   wherein the electronic processing unit comprises means for detecting the signs of the current connected to the detection and rectifying circuit in such a way as to receive the signals representative of the current polarity signs, means for processing the current signal amplitudes, and a digital processing circuit connected to the outputs of the means for detecting the signs and of the means for processing the amplitudes; and
   wherein the detection and rectifying circuit comprises a group of diodes associated with each current sensor, connected as a rectifier bridge, a first and second diode of the group of diodes being connected by their cathodes to a positive power supply point, a third and fourth diode of the group of diodes being connected by their anodes to a measuring resistance, the first and third diodes being connected in series and their common point being connected to a first output of the associated current sensor, the second and fourth diodes being connected in series and their common point being connected to a second output of the associated current sensor, one of the two outputs of the current sensor being connected to the means for detecting the sign of the current flowing in said sensor, said detection means supplying on output a first value if the current sign is positive or a second value if the current sign is negative, the common point between the third diode, the fourth diode and the measuring resistance supplying a signal representative of the absolute value of the current.

6. The electronic trip device according to claim 5, wherein the electronic processing unit determines an instantaneous value of the earth fault current by adding the values of the currents from the sensors whose corresponding sign is positive and subtracting the values of the currents from the sensors whose corresponding sign is negative.

7. An electronic trip device for a multipole electrical circuit breaker protecting an electrical power system comprising:
- a current sensor per pole supplying a secondary current proportional to a current flowing in an associated conductor of the power system protected by the circuit breaker;
- a detection and rectifying circuit to which the secondary currents are applied and which supplies signals representative of the currents flowing in the conductors to be protected;
- an electronic processing unit for receiving the signals supplied by the detection and rectifying circuit and delivering a tripping order, with or without a time delay, when the currents flowing in the conductors to be protected or an earth fault current exceed present thresholds;
- wherein the detection and rectifying circuit comprises means for supplying the processing unit separately with signals representative of the rectified secondary currents and signals representative of the signs of the polarities of said secondary currents;
- wherein the electronic processing unit comprises means for determining the value of an earth fault current representative of the vector sum of the currents flowing in the conductors to be protected;
- wherein the electronic processing unit comprises means for detecting the signs of the current connected to the detection and rectifying circuit in such a way as to receive the signals representative of the current polarity signs, means for processing the current signal amplitudes, and a digital processing circuit connected to the outputs of the means for detecting the signs and of the means for processing the amplitudes; and
- wherein the means for detecting the current signs comprise, for each sensor, a transistor comprising a reference electrode connected to the ground of a power supply, a control electrode connected to the associated current sensor and an output electrode connected to the electronic processing circuit.

8. The electronic trip device according to claim 7, wherein the electronic processing unit determines an instantaneous value of the earth fault current by adding the values of the currents from the sensors whose corresponding sign is positive and subtracting the values of the currents from the sensors whose corresponding sign is negative.

* * * * *